United States Patent [19]
Maynard et al.
[11] 4,420,825
[45] Dec. 13, 1983

[54] ELEMENT-SITED BEAMFORMER

[75] Inventors: Robert L. Maynard, Manchester; Samuel S. Ballard, Hollis; Robert L. Townsend, Amherst, all of N.H.

[73] Assignee: Sanders Associates, Inc., Nashua, N.H.

[21] Appl. No.: 263,455

[22] Filed: May 15, 1981

[51] Int. Cl.[3] .......... G01S 3/80
[52] U.S. Cl. .......... 367/122; 367/123
[58] Field of Search .......... 367/122, 123, 130

[56] References Cited

U.S. PATENT DOCUMENTS

| | | | |
|---|---|---|---|
| 4,014,023 | 3/1977 | Kirkland | 367/122 X |
| 4,200,923 | 4/1980 | Thies | 367/123 |
| 4,290,127 | 9/1981 | Pridham et al. | 367/123 |
| 4,301,523 | 11/1981 | Meland et al. | 367/130 X |
| 4,336,607 | 6/1982 | Hill et al. | 367/123 |

*Primary Examiner*—Richard A. Farley
*Attorney, Agent, or Firm*—Louis Etlinger; Donald A. Streck

[57] ABSTRACT

This invention is a hydrophone (element) sited beamformer which is coupled to an array cable of a horizontal line array. A hydrophone-sited beamformer is coupled to each hydrophone in the array. The element-sited beamformer directly forms beams from the data detected by the hydrophones by delaying and selecting some of the hydrophone detected data and summing this data with the proper shading value.

5 Claims, 3 Drawing Figures

ELEMENT-SITED BEAMFORMER

FIELD OF THE INVENTION

This invention relates generally to underwater listening devices and more particularly to the formation of directional beams in a multi-element ocean array.

BACKGROUND OF THE INVENTION

An important function performed by naval ships and naval aircraft is that of scouting or patrol; that is, searching for the enemy. Search is particularly important in antisubmarine warfare. In order to find the submarine, listening systems called sonar systems have been developed to enable the operators of the sonar equipment to detect the submarine.

Sonar systems utilize sound waves which are propagated through the water. Modern sonar systems: receive sound signals from the water, amplify the signals, and analyze the signal so that the sonar operator will receive information about objects and their movement in the sea. The sonar systems may include a variety of devices of varying degrees of complexity. These devices normally include a hydrophone array that transforms or transducers acoustic energy to electric energy, followed by some form a signal processing to feed an aural or visual display suitable for the human observer.

The sounds produced by man made objects like submarines have a different periodicity than the noise usually found in the ocean. Man made sounds propogate through the water. They have pressure peaks and pressure valleys like a wave or ripples on a pond. The foregoing waves are detected by a plurality of hydrophones that comprise a hydrophone array. One type of hydrophone array utilized in the prior art is disclosed in Woodruff, et al, U.S. Pat. No. 4,004,265, which issued on Jan. 18, 1977. Each hydrophone in the array would receive the peaks and pressure valleys of the sound wave at different times. In order for the hydrophones to produce useful information that would enable one to determine the location of a submarine, the peaks and valleys of the waves must be placed in phase. One method utilized in the prior art for placing the peaks and valleys in phase involved a process called steering. The arrays were mechanically steered by physically rotating the array elements, or the array elements were electrically steered by inserting in series with each array element appropriate phasing networks (for narrowband arrays) or time delay networks (for broadband arrays) that effectively placed the array elements along the path of the sound wave. The sine waves received by the array elements were combined, transmitted on a wire, demultiplexed and transmitted to a beamformer.

For every hydrophone in the hydrophone array there was a multiplexer. The multiplexer multiplexed the signals that were obtained from each hydrophone onto a common conductor and transmitted them to a receiver. In order to obtain individual hydrophone signals, the received signals were demultiplexed and input to a beamformer which contains a computer and a memory having many storage locations for each hydrophone. The computer processed the stored amplitude and phase of the received signals and arranged the signals with respect to their relative arrival time. Then the computer transmitted the signals to a spectrum analyzer and sonar scope where the signals would be observed and analyzed. One of the disadvantages of the foregoing method of producing beams was that a large amount of electronic equipment was needed to manipulate the stored amplitude signals with respect to the relative arrival time of the signals. The electronic equipment was expensive and required a large amount of space.

SUMMARY OF THE INVENTION

This invention overcomes the disadvantages of the prior art by obtaining the signals that make up the beam directly in sequence from each hydrophone—thus eliminating the need for a separate demultiplexer and beamformer. Performing the beamforming function at the hydrophone element simplifies the total beamformer process. This invention involves locating a delay network with each element. The summation of all elements takes place directly as the signal is fed onto the common multiplex conductor. Thus all elements have sufficient electronic time delay to delay the signal for a time up to the total propagation time for a sound signal to traverse the full length of the array. All elements can now be fed simultaneously onto the multiplex line and in this single operation a beam is formed. Thus, a unique conductance—summing scan technique is utilized on a single hydrophone array bus where each hydrophone element has a discrete memory associated with it.

It is an object of this invention to provide an element-sited beamformer in which the beams are obtained directly from each hydrophone element of the array as they are summed on to the common array conductor.

Other objects, advantages and novel features of this invention will become more apparent from the following detailed description of the invention when considered in conjunction with the accompanying drawings.

DESCRIPTION OF A PREFERRED EMBODIMENT

Figure 1:
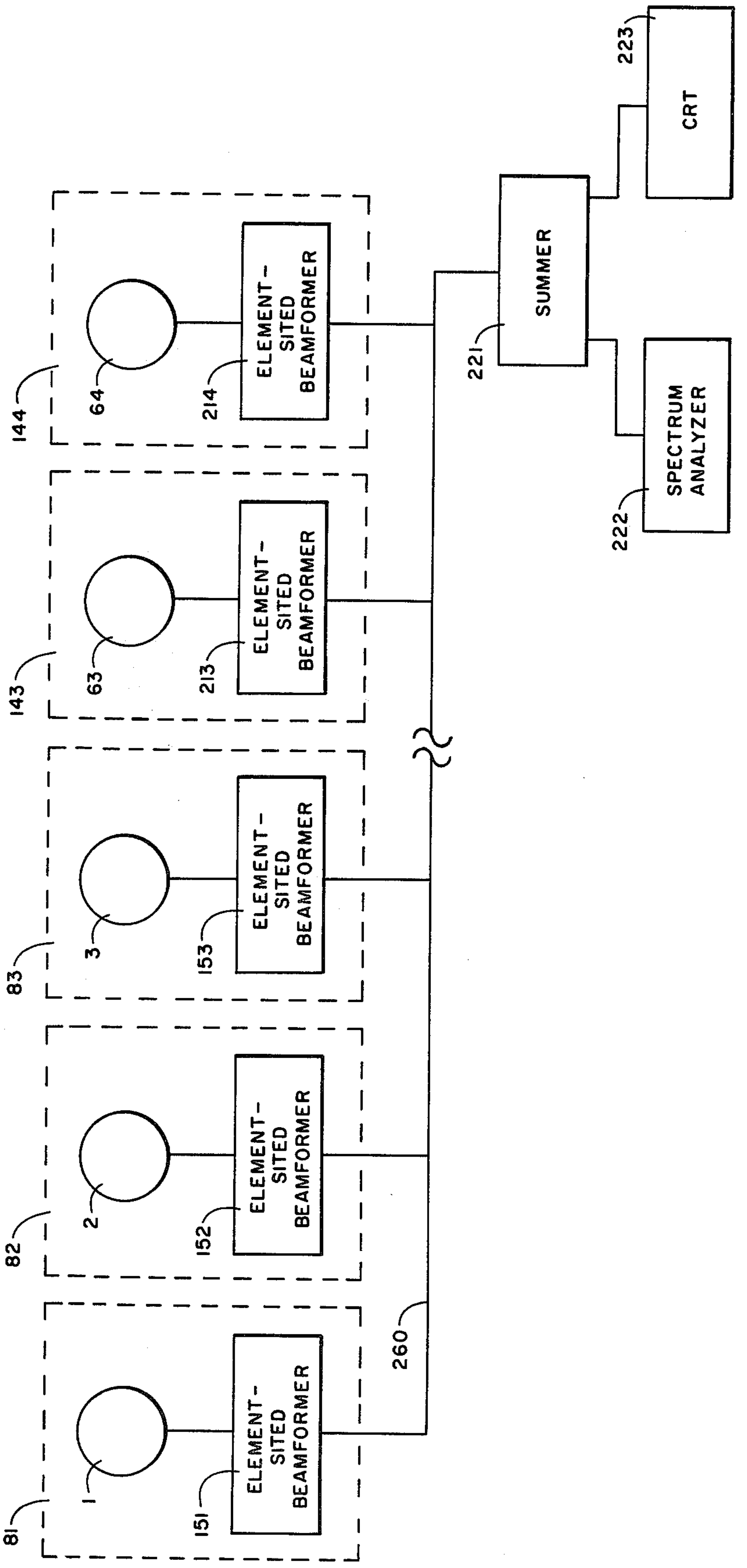
FIG. 1 is a logic diagram showing how this invention is coupled to a hydrophone array.

Referring now to the drawings in detail and more particularly to FIG. 1, the reference characters 1–64 designate a plurality of hydrophones that comprise a hydrophone array system. Typically a hydrophone array would contain between 10 and 100 hydrophones. For the purposes of this disclosure we will assume that the array contains 64 hydrophones. The hydrophones 1–64 are coupled to a corresponding plurality of element-sited beamformers 151–214, with each hydrophone being coupled to a corresponding single element-sited beamformer. A hydrophone and an element-sited beamformer are each contained in a separate package called an array element. Thus, hydrophone 1 and element-sited beamformer 151 form array element 81 and hydrophone 2 and element-sited beamformer 152 form array element 82. Hydrophone 3 and element-sited beamformer 153 comprise array element 83 and hydrophone 63 and element-sited beamformer 213 comprise array element 143. Hydrophone 64 and element-sited beamformer 214 make up array element 144. Hydrophones 14–72 and beamformers 154–212 are not shown because they are the same as those shown in FIG. 1.

Additional hydrophones and element-sited beamformers may be connected to array cable 260 in the same manner as the previous hydrophones and beamformers were connected.

Hydrophones 1–64 detect underwater sounds. All underwater sounds are generated in the time domain and are observed by hydrophones 1–64 as waveforms, the amplitude of which changes with the passage of time. The information contained in the time domain waveform is characteristic of the source which generated the waveform. Thus, the waveform may provide valuable clues not only for the identification of the source, but also for inferring something about the behavior of the source. Hydrophones 1–64 will not observe the waveforms at the same time since the hydrophones are not physically in the same place. Hence, hydrophones 1–64 will detect the waveform at different times.

In order to determine the arrival angle of the waveforms the information contained within the waveforms must be processed into beams by element-sited beamformers 151–214. Beams are formed by concentrating the nearly unidirectional flow of acoustic waves into a plurality of straight lines (each line would represent a beam) by approximately delaying and summing the information that is contained within the waveform. Each of the foregoing beamformers contains the same circuitry, hence the operation and description of one of the beamformers will be more fully described in the description of FIG. 2. The output of each of the aforementioned beamformers is connected to an array cable 260. Array cable 260 is coupled to the input of a summer 221. Summer 221 sequentially sums the input data that it receives from cable 260 to produce a directional beam. This beam is coupled to the inputs of a spectrum analyzer 222 and a CRT 223 where the beam is analyzed and an operator determines whether or not a target is present and the location of this target.

Figure 2:
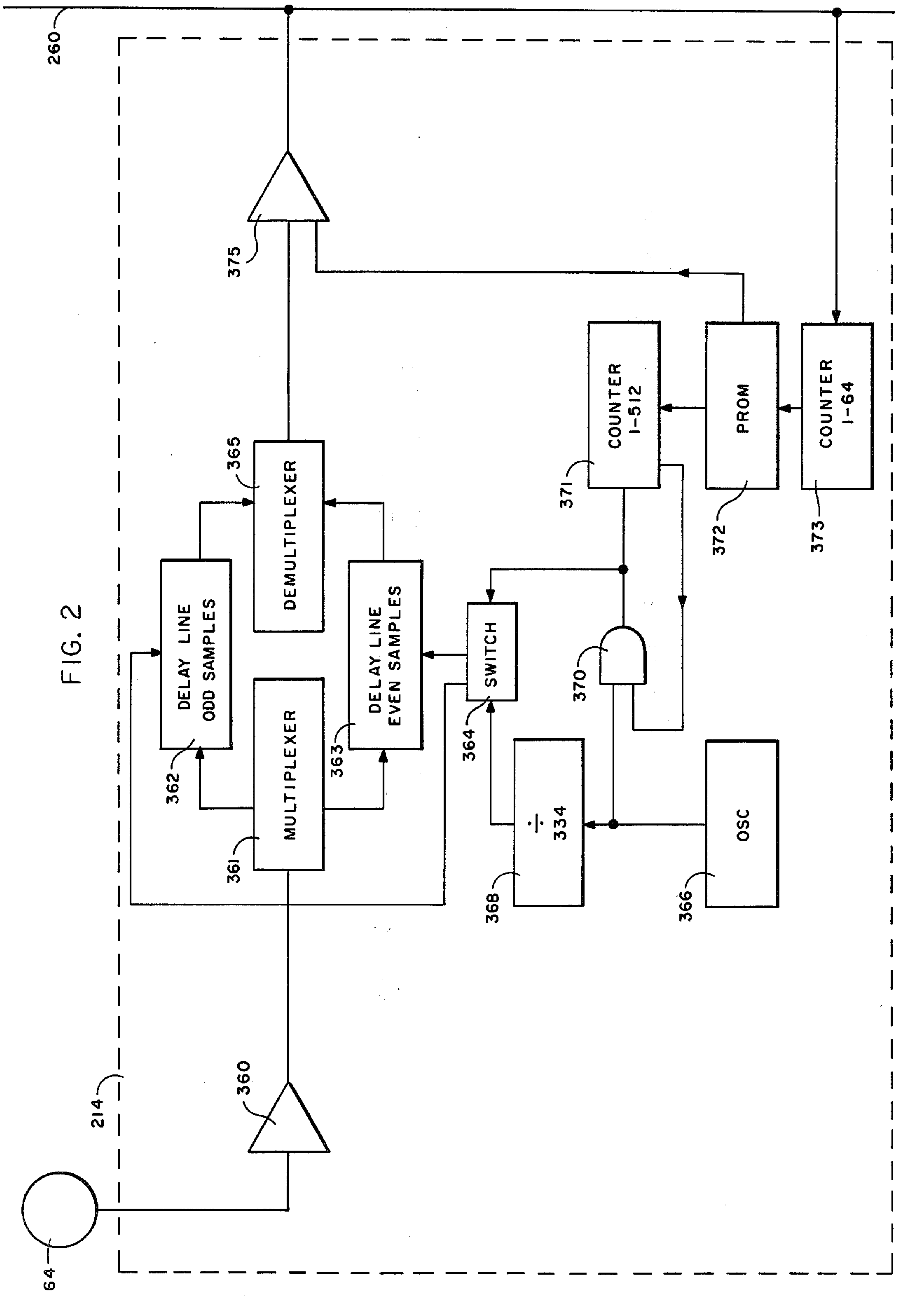
FIG. 2 is a logic diagram showing the element-sited beamformer 21 of FIG. 1 in greater detail.

FIG. 2 is a block diagram showing the element-sited beamformer 214 of FIG. 1 in greater detail. When a sound wave is detected by hydrophone 64, hydrophone 64 will output a voltage that is proportional to the amplitude of the sound wave that was sensed in a given instant in time. The foregoing voltage is transmitted to the input of an interface amplifier 360 and amplifier 360 converts its input voltage to an output voltage level that may be sampled and inserted into a pair of delay lines 362 and 363. Amplifier 360 also acts as a low-pass filter so that the sampling process will not generate alias signal components. The output of amplifier 360 is coupled to the input of a multiplixer 361 and the output of multiplixer 361 is coupled to the inputs of delay lines 362 and 363. Multiplixer 361 samples the data that is output by amplifier 360 at a sample rate $f_s$ that exceeds the Nyquist sample rate by a factor that realizes the inherent beam selectivity provided by a large number of array elements. Multiplixer 361 outputs every odd data sample received from amplifier 360 to the input of delay line 362 and outputs every even data sample to the input of delay line 363. The amount of data samples or number of delays (512, in this sample) contained within delay lines 362 and 363 and the manner in which $f_s$ is determined to be 4.0 KHz, for this example, will be hereinafter described.

Delays 362 and 363 are connected to the output of a switch 364. Switch 364 ensures that delays 362 and 363 will transmit data to the input of demultiplexer 365 at the proper time. Switch 364 clocking and selection rates will determine the data that will be inputted to demultiplexer 365. The clocking rate of switch 364 is determined by a crystal oscillator 366 and divide by 334 divider 368. Oscillator 366, in this example, transmits a 1.608 MHz clock pulse signal to the input of divider 368. Divider 368 divides this signal by 334 and produces a 4.8 KHz output pulse that has the same magnitude as $f_s$, the sample rate of hydrophone 1.

A gate 370, counters 371 and 373, and a PROM 372 determine the selection rate of switch 364. The output of divider 368 is coupled to the input of switch 364. The second input to switch 364 is the output of AND gate 370. The output of gate 370 is also coupled to the input of 1–512 counter 371. The two inputs to gate 370 are the output of counter 371 and the output of oscillator 366. One input of counter 371 is the output of PROM 372. An output of PROM 372 is also coupled to the input of an amplifier 375. Array bus 260 is coupled to the input of counter 373 and the output of counter 373 is coupled to the input of counter 371 via PROM 372. All of the 512 data samples stored within delays 362 and 363 will not be selected by switch 364. The reason why only certain data samples will be selected will be described in the description of FIG. 3.

Counter 373 counts from 1–64. Each count of counter 373 will represent one of the 64 beams that are produced by hydrophones 1–64. For each of the 64 beams that are produced, PROM 372 contains information that informs counter 371 which of the data samples stored in the 512 delays of delays 362 and 363 will be selected and transmitted to demultiplexer 365 to form a particular beam. PROM 372 will contain 64 numbers (each PROM in beamformers 151–214 will contain a unique set of 64 numbers, which are dependent upon the location of the beamformer in the hydrophone array). One number will be used for each of the 64 beams that will be formed by hydrophone 64. The numbers will be between 1 and 512 and the numbers will indicate which one of the 512 data samples will be selected from delays 362 and 363. The aforementioned numbers are determined by the equation that appears in the description of FIG. 3. Thus, PROM 372 determines for a given hydrophone and beam number what memory location of lines 362 or 363 will be selected and what weighting value will be transmitted to amplifier 375. The weighting value is dependent upon the array shading which is a scaling factor that is given to each hydrophone in the array, the scaling being chosen so as to minimize array sidelobes. PROM 372 will transmit a number (1–512) to counter 371 and amplifier 375. The aforementioned number will inform counter 371 and amplifier 375 of the particular data sample that is going to be selected from lines 362 and 363. PROM 372 will tell amplifier 375 the weighting factor ($i_s$) to be added to that data sample. When counter 371 determines that its count is equal to the number that was transmitted to it by PROM 372, counter 371 will transmit a pulse to one of the two inputs of AND gate 370. Gate 370 will be enabled when the output pulse of oscillator 366 arrives at the second input to gate 370. The output of gate 370 will turn switch 364 on at a particular count and cause a data sample that is in one of the 512 delays of lines 362 or 363 to be transmitted to demultiplexer 365. The output of demultiplexer 365 is coupled to the input of current amplifier 375 and the output of amplifier 375 is coupled to cable 260. Amplifier 375 will receive some of the 512 delay memory samples 64 delay memory samples for each beam) contained in lines 362 and 363 and multiply them by a weighting factor $i_s$. Since the total delay of lines 362 and 363 are equal to the total propagation delay of the input signal to hydrophones 1-64, the output of hydrophones 1-64 will be the sum of the ($i_s$) (data sample) that is placed on cable 260 for all 64 hydrophones.

The sample rate $f_s$ is determined by the following constraint of low phase grating lobes $SLL_g$ when f equals the design frequency. Phase grating lobes $SLL_g$ amplitude is given by:

$$SLL_g \leqq \log(\pi/s\ f/f_s)\text{dB} \quad (1)$$

This constraint permits the beam to contain meaningful information by having the lobes of the beams above a certain level to reduce the possibility of a false target triggering the beamformer.

Therefore, for example, for $SLL_g \leqq 33$ dB, $f_s/f=70$. This constraint however is avoided by this invention. Instead of forming all possible beams, if we select a subintegral such as the even numbered beams, the quantitizing error is entirely eliminated. In this we choose $f_s/f=N.886$, where N is the total number of elements, $f_s$ is the sampling frequency and f is the highest frequency of interest. Thus we have cut by ½ the number of samples required in the above equation and also eliminated the phase grating lobes.

The number of delay elements M contained within delay lines 362 and 363 must as a minimum contain the Nyquist sample rate. The Nyquist sample rate is determined by the following equations.

Fn=2×F max where F max is the highest signal frequency of interest (300 Hz=design frequency of hydrophones 11-74)

$$Fn=2\times 300=600 \text{ Hz}$$

The total storage time of each memory must equal the total acoustic delay of the array.

For a 528 ft. array the delay is =

$$\frac{\text{Length of Array}}{\text{Velocity of Propagation of Sound}} = \frac{528 \text{ f}}{4950 \text{ f/sec}} = 0.1066 \text{ secs.}$$

With a minimum Nyquist rate of 600 samples/sec and a total delay of 0.1066 secs required, each memory must as a minimum contain 0.1066 secs.×600 samples/sec=m=64 samples. However, if only this minimum memory is implemented, imperfect summation of the beam samples will occur. This is referred to as grating-lobe error, and results in unwanted lobes occuring at angles outside the desired beam. To reduce this error a large number of samples must be stored. Using a larger memory-storage device requires a higher sample rate to load it. As an example a Reticon SAD1024 device holds 512 samples in a dual storage configuration. The new sample rate, Fs, is equal to the old Nyquist rate (600 samples/sec) times the ratio of the two memory samples sizes:

$$\frac{\text{new memory size}}{\text{minimum Nyquist memory size}} = \frac{512}{64} \times 600 = 4800 \text{ samples/sec}$$

The size of the memory can be anything higher than the Nyquist minimum and is selected based on memory device availability and the required suppression of grating-lobe errors. Thus, for this example M=512.

Figure 3:
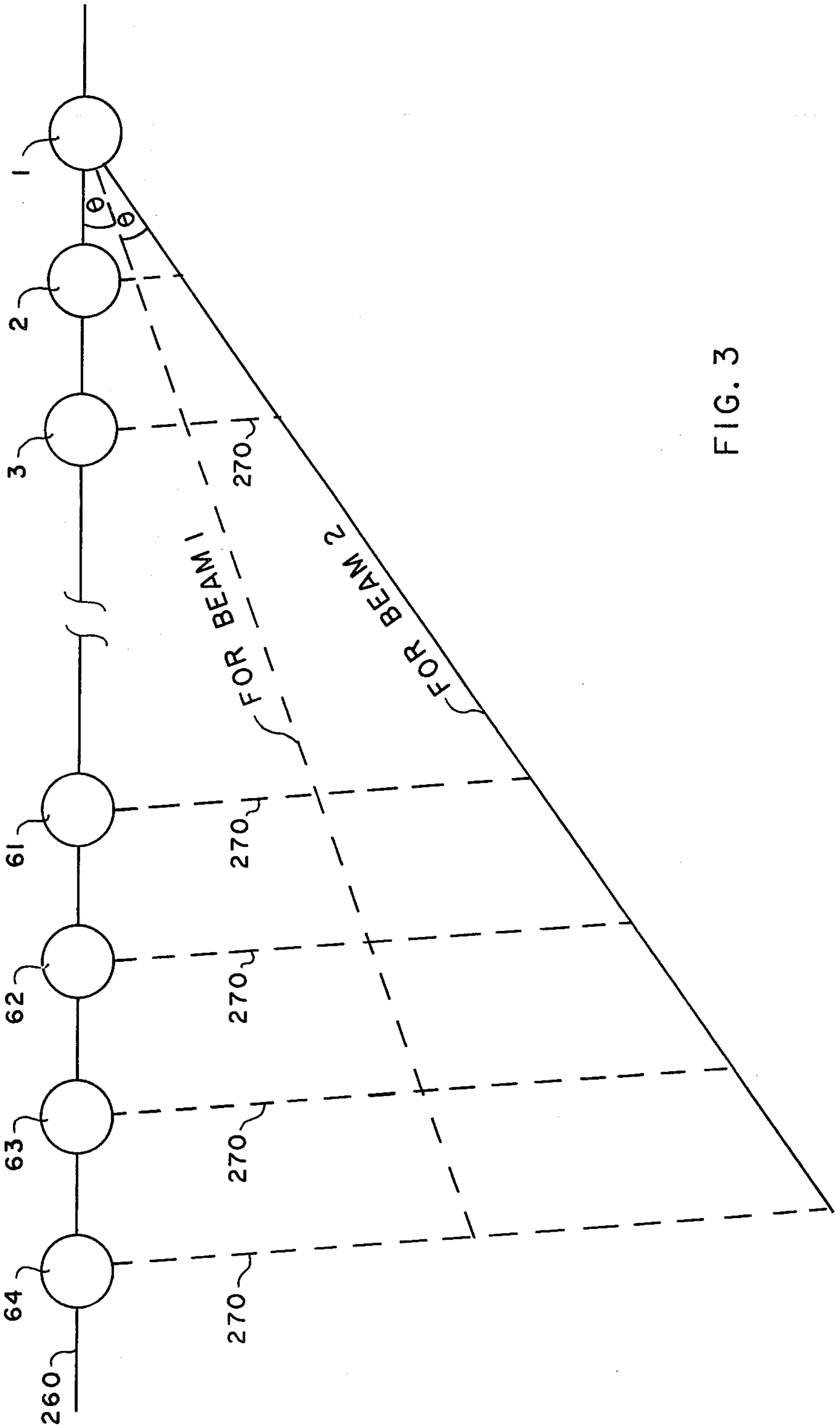
FIG. 3 is a diagram showing hydrophones 1–64 and some of the beams that beamformers 151–214 (not shown) will form from the signals received from hydrophones 1–64.

FIG. 3 is a diagram showing hydrophones 1-64 and some of the beams that beamformers 151-214 (not shown) will form from the signals received by the aforementioned hydrophones. Since the beamformers as previously mentioned would form 64 equally spaced beams, the angle $\theta$ between the center of hydrophone 1 and array cable 260 would be 180°/64=2.8125°. Thus, beam number 1 would have a $\theta=2.8125°$; and beam number 2 would have a $\theta=2(2.8125)=5.62°$, etc., as will be noted in FIG. 3. When a perpendicular line 270 is drawn between a particular hydrophone and beam 1 or beam 2, the length of line 270 is dependent upon which hydrophone and beam line 270 is connected to. The length of line 270 represents the distance that the hydrophone is away from a particular beam, since the signals that the hydrophones observe for a particular sound travel through the water at the same speed each hydrophone would detect the sound signal at a different time, hence data samples stored in different locations would have to be selected from lines 362 and 363 (FIG. 2). The location M that was selected for each hydrophone and each beam is determined by the following formula.

$$M = \frac{(N-1)d \sin\theta f_s}{V}$$

Where $N$ = number of hydrophones
$V$ = velocity of sound = 4950 ft/sec
$f_n$ = design frequency of hydrophone = 300 Hz
$d$ = distance between hydrophones $$= \lambda/2,\ v = f_n\lambda,\ \frac{4950}{300} = \lambda = 16.5;\ \lambda/2 = 8.25$$

$$f_s = 4800 \text{ Hz}$$

Substitution of numbers into the above equation would show that for hydrophone 64 and beam number 1, the data sample selected from delay lines 362 or 363 would be at memory location $$M = \frac{(64)(8.25)(\sin 2.81)(4800)}{4950}\ 25.100 = 25. \text{ (rounded to the nearest integer)}$$

For beam number 2, hydrophone 64 would receive the data samples stored in memory location $$M = \frac{64(8.25)(\sin 5.62)(4800)}{4950} = 50.140 = 50.$$

The memory location of lines 362 and 363 for particular hydrophones and beams may be determined by substituting the appropriate numbers in the above equations.

While we have herein shown and described various forms of our invention and the best mode presently contemplated by us in carrying out our invention, many modifications may occur to those skilled in the art without departing from the sport and scope of our invention. It is therefore desired that the protection afforded by Letters Patent to be limited only by the true scope of the appended claims.

What we claim is:

1. A system for the direct formation of directional beams from individual hydrophones of a hydrophone array in which the hydrophones are coupled to an array cable, the system comprising:

(a) a plurality of amplifying means located at the site of respective ones of the individual hydrophones for converting hydrophone signal voltages into data that may be sampled, the input of each of said amplifying means being coupled to the output of a particular hydrophone in said array;

(b) a plurality of delaying means located at the site of respective ones of the individual hydrophones for receiving, storing and delaying the output data from the associated one of said amplifying means, the input of each of said delaying means being coupled to the output of said amplifying means which is located at the same hydrophone as said delaying means;

(c) a plurality of controlling means located at the site of respective ones of the individual hydrophones for controlling the output of said delaying means so that only data samples that represent the beam currently being formed will be output by said delaying means at a specified time, the input of each of said controlling means being coupled to the output of said delaying means which is located at the same hydrophone as said controlling means;

(d) a plurality of coupling means located at the site of respective ones of the individual hydrophones for coupling the output data of said delaying means to said array cable at the time specified by said controlling means, the input of each of said coupling means being connected to the output of said delaying means which is located at the same hydrophone as said coupling means, and the output of each of said coupling means being coupled to said array cable; and (e) a summer which is coupled to said array cable, said summer being adapted to sum the data placed on said cable, whereby the beams detected by each of said hydrophones will be obtained in sequence from said array cable.

2. The system claimed in claim 1 wherein said delaying means comprises:

(a) a multiplexer whose input is coupled to said amplifying means, said multiplexer being adapted to receive and multiplex the data from said amplifying means;

(b) means for receiving and storing the output of said multiplexer; and (c) a demultiplexer coupled to the output of said receiving and storing means, said demultiplexer being adapted to demultiplex data output by said receiving and storing means.

3. The system claimed in claim 2 wherein said receiving and storing means is a delay line.

4. The system claimed in claim 1 wherein said controlling means comprises:

(a) a clock oscillator;

(b) a first counter whose input is coupled to said array cable; said first counter being adapted to count up to the number of hydrophones contained in said array;

(c) memory means for storing a shading weight for each hydrophone and instructions that determine which data will be selected from said receiving, storing and delaying means, the input of said memory means being coupled to the output of said first counter and the output of said memory being coupled to said coupling means;

(d) a second counter whose input is coupled to said memory means, said second counter being adapted to count up to the amount of data stored in said receiving, storing and delaying means;

(e) an AND gate whose inputs are coupled to the output of said clock oscillator and the output of said second counter; and (f) switch means whose inputs are coupled to the output of said second counter, said AND gate and said oscillator and whose output is coupled to said receiving, storing and delaying means, for selecting the data sampled from said receiving, storing and delaying means that represents the count of said second counter.

5. The system claimed in claim 4 wherein said memory means is adapted to cause said switch means to select only the even numbered beams thereby eliminating the phase grating lobes.

* * * * *